US012335398B2

(12) United States Patent
Parwani et al.

(10) Patent No.: US 12,335,398 B2
(45) Date of Patent: Jun. 17, 2025

(54) CONDITIONAL TIME-BASED ONE TIME PASSWORD TOKEN ISSUANCE BASED ON LOCALLY AGGREGATED DEVICE RISK

(71) Applicant: Omnissa, LLC, Mountain View, CA (US)

(72) Inventors: Rahul Parwani, Atlanta, GA (US); Evan H. Hurst, Decatur, GA (US); Maxim J. Blinder, Dunwoody, GA (US); Gazal Makkar, Pittsburgh, PA (US); Rijul Nirwal, Los Angeles, CA (US)

(73) Assignee: Omnissa, LLC, Mountain View, CA (US)

( * ) Notice: Subject to any disclaimer, the term of this patent is extended or adjusted under 35 U.S.C. 154(b) by 144 days.

(21) Appl. No.: 17/975,309

(22) Filed: Oct. 27, 2022

(65) Prior Publication Data

US 2024/0146534 A1    May 2, 2024

(51) Int. Cl.
*H04L 9/32*     (2006.01)
*H04L 9/08*     (2006.01)

(52) U.S. Cl.
CPC .......... *H04L 9/3228* (2013.01); *H04L 9/0863* (2013.01); *H04L 9/0869* (2013.01)

(58) Field of Classification Search
CPC ... H04L 9/3228; H04L 9/0863; H04L 9/0869; H04L 9/32
See application file for complete search history.

(56) References Cited

U.S. PATENT DOCUMENTS 9,208,299 B2   12/2015   Birk et al.
9,270,655 B1   2/2016    Juels et al.
(Continued)

OTHER PUBLICATIONS

International Search Report and Written Opinion mailed Aug. 15, 2024 in International Application No. PCT/US2023/034226, 8 pages.

*Primary Examiner* — Quazi Farooqui
(74) *Attorney, Agent, or Firm* — Kim & Stewart LLP

(57) ABSTRACT

Disclosed are various embodiments for conditional time-based one time password token issuance based on locally aggregated device risk. Embodiments of this application can evaluate the security of the client device using mobile threat defense signals or a device posture summary before generating a seed on the client device to ensure the security of all the connected systems as a whole. Additionally, embodiments of this application can evaluate the security of the client device to determine if changes have been made that require a remedial action to be taken. In some embodiments, the client device may be completely disconnected from the network and capable of generating time-based one time passwords, while remaining offline. However, offline attacks may still occur; in such a situation, the client device can determine the security of the device and perform the remedial actions independent of other devices, systems, computing environments, or networks. In at least another embodiment, when the client device is determined to not be secure, the client device can inform the authentication service over a connected network that security issues may exist in the client device and actions may need to be taken at the authentication service to ensure the client does not further compromise the account.

20 Claims, 3 Drawing Sheets

(56) References Cited

U.S. PATENT DOCUMENTS

| | | | |
|---|---|---|---|
| 9,361,451 B2 | 6/2016 | Oberheide et al. | |
| 10,326,797 B1* | 6/2019 | Murray | H04L 9/0825 |
| 11,720,660 B2* | 8/2023 | Bowness | H04L 63/0853 |
| | | | 726/9 |
| 2015/0188938 A1* | 7/2015 | Freeze-Skret | H04L 63/08 |
| | | | 726/22 |
| 2020/0389491 A1* | 12/2020 | Buck | G06F 21/88 |
| 2021/0194883 A1 | 6/2021 | Badhwar et al. | |
| 2021/0216656 A1* | 7/2021 | Xuan | G06F 16/258 |

\* cited by examiner

CONDITIONAL TIME-BASED ONE TIME PASSWORD TOKEN ISSUANCE BASED ON LOCALLY AGGREGATED DEVICE RISK

BACKGROUND

Authenticator applications can generate one time passwords (OTPs) that can be used in multi-factor authentication (MFA) or two-factor authentication (2FA). To generate OTPs, authenticator applications must generate or otherwise receive a private key, often called a seed, that is shared between a user device and the authorizing application. The seed can then be used by a specified algorithm to generate an OTP. Authenticator applications often generate these OTPs as time-based OTPs (TOTPs), where both the time on a user device and the seed are used by a specified algorithm to generate a TOTP.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
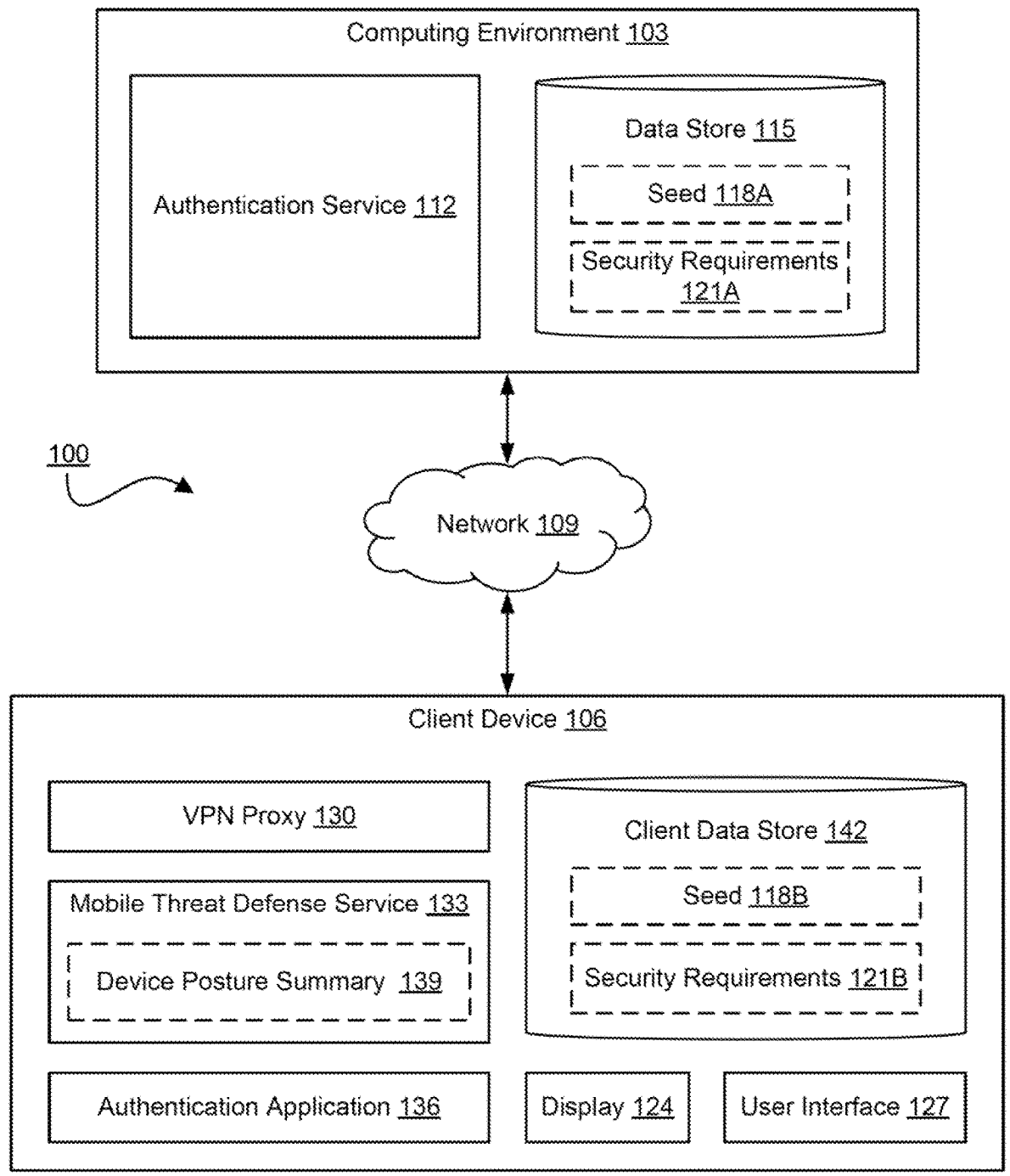
FIG. 1 is a drawing of a network environment according to various embodiments of the present disclosure.

Disclosed are various approaches for conditional time-based one time password token issuance based on locally aggregated device risk. Authenticator applications can generate one time passwords (OTPs) that can be used in multi-factor authentication (MFA) or two-factor authentication (2FA). To generate OTPs, authenticator applications must generate or otherwise receive a private key, often called a seed, that is shared between a user device and the authorizing application. The seed can then be used by a specified algorithm to generate an OTP. Authenticator applications often generate these OTPs as time-based OTPs (TOTPs), where both the time on a user device and the seed are used by a specified algorithm to generate a TOTP.

Seeds are often stored locally on a device, which can cause various security concerns if the device is not secure. For instance, if a device is compromised (stolen or unauthorized use), jailbroken, or rooted while running an authenticator application, the TOTP codes could be collected and used to reverse engineer the seed used by the algorithm to generate the TOTP codes. For instance, an attacker may use a padding oracle attack or a man-in-the-middle attack to discover the seed. In at least another embodiment, the attacker of the compromised, jailbroken, or rooted device may be able to read a seed exactly as it is stored locally on the device. These attacks can result in compromised security for both the client device and the system that provides authentication. Stated differently, if the attacker has the seed or can generate a TOTP without the authorization application, then the system which verifies the TOTP is also compromised by potentially allowing the attacker to otherwise gain access.

Embodiments of this application can evaluate the security of the client device using mobile threat defense signals or a device posture summary before generating a seed on the client device to ensure the security of all the connected systems as a whole. Additionally, embodiments of this application can evaluate the security of the client device to determine if changes have been made that require a remedial action to be taken, such as preventing the further generation of TOTPs or revocation of the seed from the client device. In some embodiments, the client device can be completely disconnected from the network and generating TOTPs, but offline attacks may still occur; in such a situation, the client device can determine the security of the device and perform the remedial actions independent of other devices, systems, computing environments, or networks. In at least another embodiment, when the client device is determined to not be secure, the client device can inform the authentication service over a connected network that security issues may exist in the client device and actions may need to be taken at the authentication service to ensure the client does not further compromise the account.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a computing environment 103 and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 can include an authentication service 112 and other applications, services, processes, systems, engines, or functionality not discussed in detail herein.

The authentication service 112 can be a portion of a larger application that requires user authentication to access specified, private or otherwise confidential documents, files, or materials on the computing environment 103. The authentication service 112 can generate requests for a client device 106 to generate a seed 118. In at least one embodiment, such requests may include an encrypted copy of a seed 118A. In at least another embodiment, the request for the client to generate a seed 118 can include instructions to generate a seed 118 based on pre-shared information. The authentication service 112 can also send security requirements 121 to a client device 106.

The authentication service 112 can also receive requests to authenticate the identity of a user of a client device 106. The requests to authenticate can include an OTP or a TOTP, as well as other identifying information (e.g., username, password, etc.). The authentication service 112 can determine which seed 118A stored in the data store 115 corresponds to a specified client device 106 and generate an OTP or TOTP to validate such a request to authenticate. If the generated OTP or TOTP matches the received OTP or TOTP from the request to authenticate, then the authentication service 112 can send a token to the client device 106 to authorize access to other applications or services controlled by the computing environment 103.

The authentication service 112 can also be executed to receive notifications from one or more client devices 106 that indicate that the client device 106 has been compromised. In such a situation, the authentication service 112 can then deauthorize the seed 118A or otherwise prevent authorizing any OTPs or TOTPs until a secure posture on the client device 106 has been re-established.

Also, various data is stored in a data store 115 that is accessible to the computing environment 103. The data store 115 can be representative of a plurality of data stores 115, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 115 is associated with the operation of the various applications or functional entities described below. This data can include seeds 118A and security requirements 121B, and potentially other data.

The seeds 118 can represent one or more cryptographic keys that can be used generate an OTP. The seeds 118A can be stored on the data store 115 and the seeds 118B can be stored in the client data store 142. The one or more cryptographic keys can be asymmetric cryptographic keys. In many embodiments, the cryptographic keys can be a random or pseudo-random set of characters that can be used by one or more algorithms to generate OTPs. For example, the cryptographic keys can be used by a version of a time-based one-time password algorithm or a HMAC-based one-time password algorithm. To generate an OTP on the client device 106, the client device 106 should include one or more seeds 118B. To permit access to any service that requires MFA, the computing environment 103 must include a seed 118A that corresponds or otherwise matches the seed 118B from the client device 106 so that both the client device 106 and the computing environment 103 can calculate a corresponding or matching OTP.

The security requirements 121 can represent one or more rules or instructions for a client device 106 that, when evaluated, can ensure that the client device 106 is permitted to perform actions that could cause security risks to the client device 106 or the computing environment 103. Administrators of the computing environment 103 can generate the security requirements 121A, which can be stored on the data store 115. When a client device 106 first attempts to generate a seed 118B to gain access with the computing environment 103, then the client device 106 can obtain the security requirements 121A and store the obtained security requirements 121 in the client data store 142 as security requirements 121B.

The security requirements 121 can include one or more rules that ensure the device is secured. For instance, security requirements 121 can include the requirement that a client device 106 have the operating system's firewall turned on; a client device 106 without a firewall may likely not be secure. In at least another example, security requirements 121 can include that the client device 106 not be jailbroken or rooted; given that a jailbroken or rooted client device 106 may not be secure. Additional security requirements 121 may include a determination of whether the client device 106 is file system encryption enabled, whether the client device 106 is password enabled, whether the client device 106 is screen lock enabled, whether the client device 106 is USB-debugging enabled, and/or whether the client device 106 is development mode enabled. In at least another example, the security requirements 121 can include an operating system version number that, when compared to the version number of the operating system on the client device 106, can determine whether the device is secure. The rules of the security requirements 121 can also be compared to a device posture summary 139 from a mobile threat defense service 133 to determine the security of the device.

The security requirements 121 can also include one or more instructions that, when evaluated, can determine the security of the client device 106. For instance, the instructions of the security requirements 121 can request information from the operating system APIs of the client device 106 and compare such information to specified values that meet the security requirements. For example, the instructions of the security requirements 121 can obtain a current operating system version or a status of a firewall for the computing device to ensure the device is secure. Additionally, the instructions of the security requirements 121 can search and filter information in the device posture summary 139. For example, the instructions of the security requirements 121 can search the device posture summary 139 to determine if any attacks have been detected by the mobile threat defense service 133 in a specified period of time (e.g., 6-months, 12-hours, etc.).

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 124, such as liquid crystal displays (LCDs), gas plasma-based flat panel displays, organic light emitting diode (OLED) displays, electrophoretic ink (E-ink) displays, projectors, or other types of display devices. In some instances, the display 124 can be a component of the client device 106 or can be connected to the client device 106 through a wired or wireless connection.

The client device 106 can be configured to execute various applications such as a virtual private network (VPN) proxy 130, a mobile threat defense service 133, an authentication application 136, and/or other applications. The authentication application 136 (in some embodiments, in combination with the VPN proxy 130) can be executed in a client device 106 to access network content served up by the computing environment 103 or other servers, thereby rendering a user interface 127 on the display 124. To this end, the authentication application 136 can include a browser, a dedicated application, or other executable, and the user interface 127 can include a network page, an application screen, or other user mechanism for obtaining user input. The client device 106 can be configured to execute applications beyond the VPN proxy 130, the mobile threat defense service 133, and the authentication application 136, such as email applications, social networking applications, word processors, spreadsheets, or other applications.

The VPN proxy 130 can be executed to assist a mobile threat defense service 133 detect network attacks on the client device 106 by routing traffic through the VPN proxy 130. In at least one embodiment, the VPN proxy 130 can track network traffic to or from the client device 106 to determine if suspicious activity is occurring. For instance, the VPN proxy 130 can recognize that the client device 106 is attempting to connect to another device over a network 109 that is known for phishing attacks. In at least one embodiment, the VPN proxy 130 can block that traffic to avoid any information about the client device 106 being exposed. In at least another embodiment, the VPN proxy 130 can allow the traffic, but report the suspicious activity to the mobile threat defense service 133.

The mobile threat defense service 133 can be executed to detect security threats on the client device 106. For instance, the mobile threat defense service 133 can be executed to detect machine-in-the-middle attacks, rogue access points (or rogue network attacks), malware (e.g., spyware, surveillance ware, sideloaded applications), phishing attacks, and other malicious content. The mobile threat defense service 133 can detect application-based threats like application vulnerabilities and risky application behaviors and configurations. The mobile threat defense service 133 can detect phishing via email, SMS, and messaging applications, as well as through the access of malicious network content via the VPN proxy 130. The mobile threat defense service 133 can detect zero-day threats and device vulnerabilities including jailbreak and root access detection. The mobile threat defense service 133 can detect machine-in-the-middle attacks and risky behaviors such as SSL certificate stripping, forcing weaker algorithm negotiation; anomalous application network connection activity, and vulnerabilities associated with rogue Wi-Fi. The mobile threat defense service 133 can also detect memory leaks from leaky applications stored on the client device 106. An example of a mobile threat defense service 133 includes VMWare's Workspace ONE Mobile Threat Defense. The mobile threat defense service 133 can continually check for various configuration changes or security threats and store such information in the memory of the client device 106 or in the client data store 142 along with information that identifies the configuration change or security threat, such as date, time, any network addresses associated with attack or configuration change, applications associated with the attack or configuration change, and various other information.

The mobile threat defense service 133 can generate a device posture summary 139. In at least one embodiment, the device posture summary 139 can represent a document or a file stored in memory that indicates various information about the security of the client device 106. In at least another embodiment, the device posture summary 139 can represent one or more signals that can be shared with specified applications on the client device 106, such as the authentication application 136; such signals can include various information about the security of the client device 106. For instance, the device posture summary 139 can include any of the security threats, configurations, or other data detected by the mobile threat defense service 133. The device posture summary 139 can include dates and times of specified attacks or configuration changes to allow for more granular searches based on periods of time since attacks have occurred.

The authentication application 136 can be executed to enroll a user into MFA or 2FA by generating a seed 118B if the device is in a secure posture, generate OTP or TOTP tokens that can be used to authenticate a user with a service on the computing environment 103, and perform a remedial action when the device fails to remain in a secure posture. Additional details of at least some the actions of the authentication application 136 are described in the following discussion of FIGS. 2 and 3.

Figure 2:
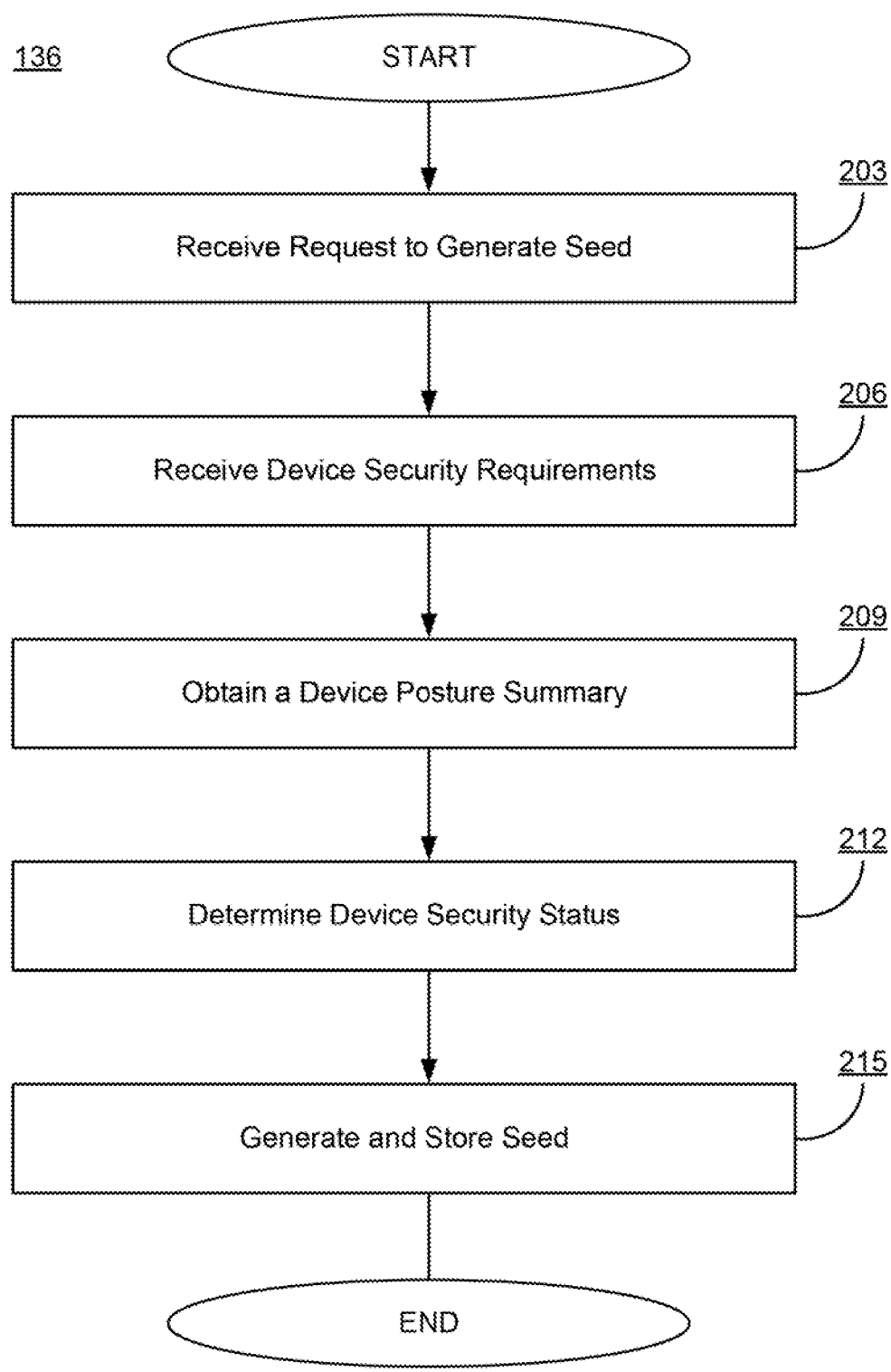
FIG. 2 is a flowchart illustrating one example of functionality implemented as portions of an application executed in a computing environment in the network environment of FIG. 1 according to various embodiments of the present disclosure.

As further described in FIG. 2, the authentication application 136 can be executed to receive a request to generate a seed 118B which enrolls a user into MFA or 2FA. The authentication application 136 can be executed to receive device security requirements 121 from the computing environment 103 that detail the posture that the client device 106 needs to be in to generate a seed 118 and generate an OTPs or TOTPs. The authentication application 136 can obtain a device posture summary 139 from the mobile threat defense service 133 that details the posture of the client device 106 currently and over a period of time. The authentication application 136 can determine a device security status that corresponds to whether the device is in the appropriate posture to generate and store the seed 118 based on the security requirements 121B. If the device security status indicates that the client device 106 is in the appropriate posture, the authentication application 136 can be executed to generate and store a seed 118B in the client data store 142.

Figure 3:
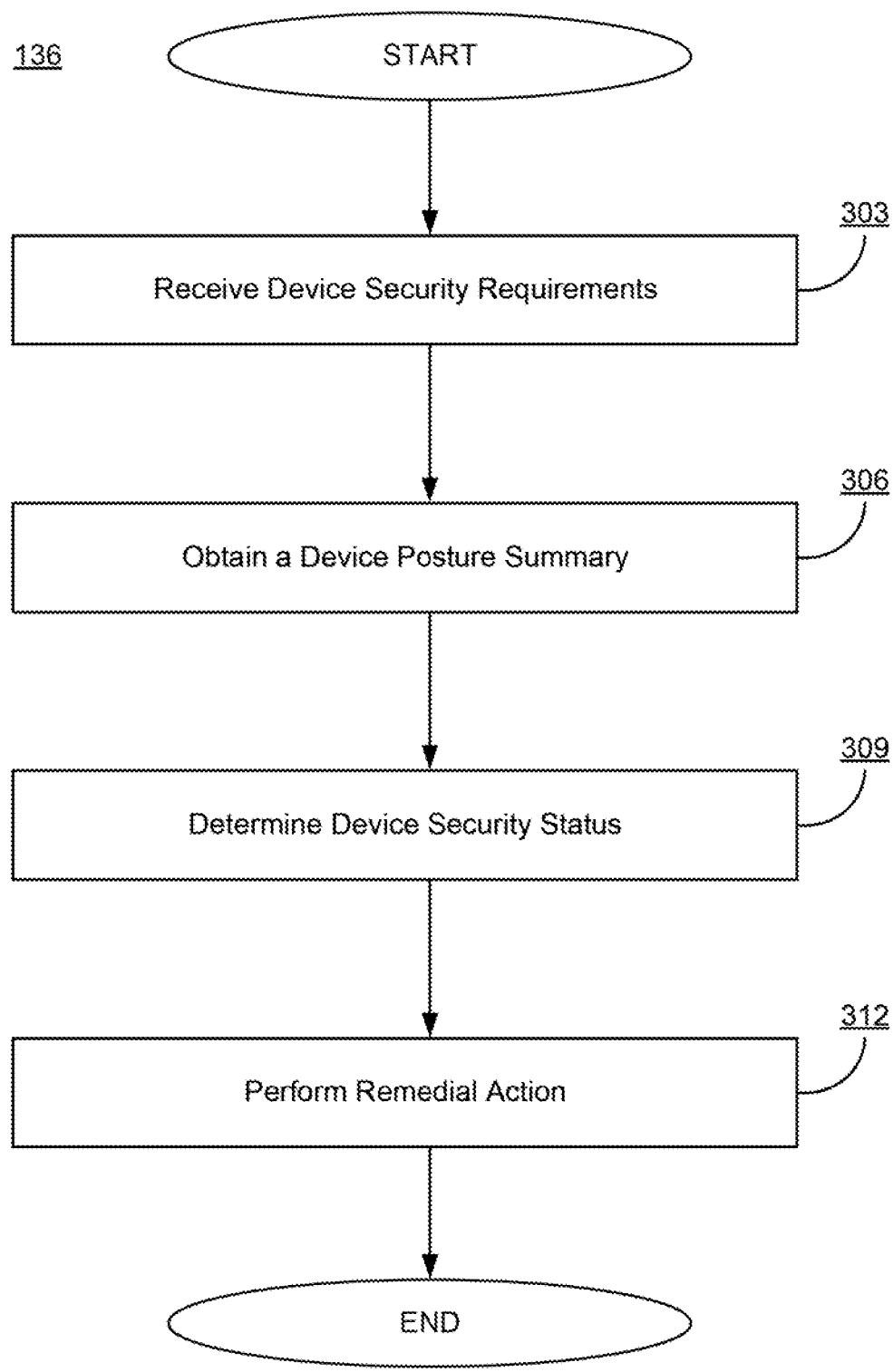
FIG. 3 is a flowchart illustrating another example of functionality implemented as portions of an application executed in a computing environment in the network environment of FIG. 1 according to various embodiments of the present disclosure.

As further described in FIG. 3, the authentication application 136 can also be executed to receive device security requirements 121B from the client data store 142 or security requirements 121A from the computing environment 103. The authentication application 136 can obtain a device posture summary 139 from the mobile threat defense service 133 that details the posture of the client device 106 currently and over a period of time. The authentication application 136 can determine a device security status that corresponds to whether the device is in the appropriate posture to generate an OTP or a TOTP based on the received security requirements 121. If the client device 106 is not in the appropriate posture to generate an OTP or a TOTP, the authentication application 136 can perform a remedial action, such as removing the seed 118 from the client device 106, preventing the generation of additional OTPs or TOTPs from the client device 106, sending a notification to the authentication service 112 that the client device 106 may have been compromised and prevent access so that the authentication service 112 can prevent further access related to the specified account, or other various remedial actions.

Also, various data is stored in a client data store 142 that is accessible to the client device 106. The client data store 142 can be representative of a plurality of client data stores 142, which can include relational databases or non-relational databases such as object-oriented databases, hierarchical databases, hash tables or similar key-value data stores, as well as other data storage applications (e.g., file systems) or data structures. Moreover, combinations of these databases, data storage applications, and/or data structures may be used together to provide a single, logical, data store. The data stored in the client data store 142 is associated with the operation of the various applications or functional entities described below. This data can include one or more seeds 118B and security requirements 121B, and potentially other data. The seeds 118B are otherwise identical to seeds 118A, which are fully described in the previous discussion of data store 115. The security requirements 121B are otherwise identical to seeds 118A, which are fully described in the previous discussion of data store 115.

Referring next to FIG. 2, shown is a flowchart that provides one example of the operation of a portion of the authentication application 136. The flowchart of FIG. 2 provides merely an example of the many different types of functional arrangements that can be employed to implement the operation of the depicted portion of the authentication application 136. As an alternative, the flowchart of FIG. 2 can be viewed as depicting an example of elements of a method implemented within the network environment 100.

Beginning with block 203, the authentication application 136 can receive a request to generate a seed 118B. In at least one embodiment, the authentication service 112 can send the authentication application 136 a request to generate a seed 118 that would allow both the computing environment 103 and the client device 106 to generate corresponding or matching OTPs or TOTPs. Such a request could provide a pre-generated seed 118A or instructions on how to generate such a seed 118. For instance, instructions to generate a seed 118 could include using a specified token negotiated during an SSL or HTTPS session along with other information provided in the request, such as a time stamp or another piece of data to generate matching seeds 118 between both the computing environment 103 and the client device 106. In at least one embodiment, the authentication service 112 can receive a request to generate a seed from a user interface 127 of the client device 106. For instance, a user interface 127 of the client device 106 can be setup to receive information about a service that requires MFA or 2FA. The authentication application 136 can then request information from the computing environment 103 about generating a seed 118 for such a service.

Continuing to block 206, the authentication application 136 can receive device security requirements 121B. If the client device 106 does not currently have security requirements 121B stored in the client data store 142, then the authentication application 136 can obtain security requirements 121A from the computing environment 103. This process may include sending a request to the authentication service 112 requesting the security requirements and receiving security requirements 121 as a response from the authentication service 112. Because the security requirements 121A can be specific for access to different services on the computing environment 103, the authentication application 136 can provide certain levels of access the client device 106 would have access to in the request for security requirements 121A. In at least another embodiment, the client device 106 may have already received the security requirements 121 and stored such security requirements 121 in the client data store 142 as security requirements 121B. In such an embodiment, the authentication application 136 can receive the security requirements 121B from the client data store 142.

Continuing to block 209, the authentication application 136 can obtain a device posture summary 139 from the mobile threat defense service 133. The authentication application 136 can send a request to the mobile threat defense service 133 to provide a device posture summary 139. In response, the mobile threat defense service 133 can respond with a device posture summary 139. In at least one embodiment, the device posture summary 139 can represent a document or a file stored in memory that indicates various information about the security of the client device 106. In at least another embodiment, the device posture summary 139 can represent one or more signals that can be shared with specified applications on the client device 106, such as the authentication application 136; such signals can include various information about the security of the client device 106. For instance, the device posture summary 139 can include any of the security threats, configurations, or other data detected by the mobile threat defense service 133. The device posture summary 139 can include dates and times of specified attacks or configuration changes to allow for more granular searches based on periods of time since attacks have occurred.

Continuing to block 212, the authentication application 136 can determine a device security status. Generally, the device security status can indicate whether the device is secure or insecure to perform a specified action. Here, the device security status can indicate whether the device is in the appropriate posture (secure or insecure) to generate and store a seed 118. To determine the device security status, the authentication application 136 can evaluate the rules and/or instructions of the device security requirements 121B. In at least one embodiment, the authentication application 136 can evaluate the rules of the device security requirements 121B against the device posture summary 139. In at least another embodiment, the authentication application 136 can request specified configurations or settings from the client device 106 to compare with the security requirements 121B. Additionally, instructions in the security requirements 121B can be evaluated to determine the security of the client device 106, as previously discussed in the discussion of security requirements 121 of FIG. 1. If the authentication application 136 determines that the client device 106 fails to meet one or more of the security requirements 121B, the authentication application 136 can determine that the device security status is not secure to perform the specified action, in this case generate and store a seed 118. In such a situation, the process would not continue to block 215 and the process would end. However, if the authentication application 136 determines that the client device 106 meets the security requirements 121B then the authentication application 136 can continue to block 215.

Continuing to block 215, the authentication application 136 can generate and store the seed 118B in the client data store 142. In at least one embodiment where the request to generate the seed 118 included a seed 118 from another device, such as the computing environment 103, the generation of a seed 118B can be skipped. In at least one embodiment where the request to generate the seed 118 includes instructions, the authentication application 136 can generate the seed 118B according to the instructions. Additionally, the authentication application 136 can store any received or generated seed 118 in the client data store 142 as a seed 118B. The authentication application 136 can also notify the authentication service 112 that the seed 118B has been generated and stored on the client device 106 to begin OTP or TOTP generation on both the computing environment 103 and the client device 106. Once the authentication application 136 has completed those actions of block 215, the process of FIG. 2 can end.

Referring next to FIG. 3, shown is a flowchart that provides one example of the operation of a portion of the authentication application 136. The flowchart of FIG. 3 provides merely an example of the many different types of functional arrangements that can be employed to implement the operation of the depicted portion of the authentication application 136. As an alternative, the flowchart of FIG. 3 can be viewed as depicting an example of elements of a method implemented within the network environment 100. In at least one embodiment of the process of FIG. 3 can be performed offline, with no connection to a network 109 or the computing environment 103.

Beginning with block 303, the authentication application 136 can receive device security requirements 121B as previously discussed in block 206 of FIG. 2. At block 306, the authentication application 136 can obtain a device posture summary 139 as previously discussed in block 209 of FIG. 2.

Continuing to block 309, the authentication application 136 can determine a device security status. Generally, the device security status can indicate whether the device is secure or insecure to perform a specified action. Here, the device security status can indicate whether the device is in the appropriate posture (secure or insecure) to generate an OTP or TOTP. To determine the device security status, the authentication application 136 can evaluate the rules and/or instructions of the device security requirements 121B. In at least one embodiment, the authentication application 136 can evaluate the rules of the device security requirements 121B against the device posture summary 139. In at least another embodiment, the authentication application 136 can request specified configurations or settings from the client device 106 to compare with the security requirements 121B. Additionally, instructions in the security requirements 121B can be evaluated to determine the security of the client device 106, as previously discussed in the discussion of security requirements 121 of FIG. 1. If the authentication application 136 determines that the client device 106 fails to meet one or more of the security requirements 121B, the authentication application 136 can determine that the device security status is not secure to perform the specified action, in this case generate OTP or TOTP. In such a situation, the process can continue to block 312. However, if the authentication application 136 determines that the client device 106 meets the security requirements 121B, then the process of FIG. 3 can end. Alternatively, if the authentication application 136 determines that the client device 106 meets the security requirements 121B, the process can return to block 306 to continue checking the device posture continually.

Continuing to block 312, when the device security status indicates that the client device 106 is insecure, the authentication application 136 can perform a remedial action to prevent any information on the computing environment 103 from also becoming compromised. Remedial actions can include removing the seed 118B from the client device 106, preventing the generation of additional OTPs or TOTPs on the client device 106, or sending a notification to the computing environment 103 that the client device 106 has been compromised. Certain remedial actions, such as removing the seed 118B from the client device 106 and sending a notification to the computing environment 103 may require the client to obtain a new seed 118 to generate OTPs or TOTPs in order to access the services on the computing environment 103.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a request to generate a seed, wherein the seed can be used to generate one or more one-time passwords that authenticate the computing device with an authentication service;
receive, from the authentication service, device security requirements that specify a posture of the computing device that is required to generate the seed;
obtain a device posture summary from a mobile threat defense service operating on the computing device, wherein the device posture summary includes security information of the computing device;
determine a device security status based at least in part on the device posture summary and the device security requirements;
generate, when the device security status indicates that the device posture summary is acceptable based on the device security requirements, the seed; and
store the seed on the computing device.

2. The system of claim 1, wherein the device posture summary indicates that the computing device is at least one of jailbroken or rooted.

3. The system of claim 1, wherein the device posture summary indicates that the computing device has received one or more security threats over network communication.

4. The system of claim 3, wherein the one or more security threats include at least one of a phishing attempt or an attempt to remotely control the computing device.

5. The system of claim 1, wherein:
the device posture summary is a first device posture summary;
the device security status is a first device security status; and
the machine-readable instructions stored in the memory that, when executed by the processor, further cause the computing device to at least:
obtain a second device posture summary from the mobile threat defense service;
determine a second device security status based at least in part on the second device posture summary and the device security requirements; and
perform, in response to determining that the second device security status indicates that the computing device is not secure, a remedial action.

6. The system of claim 5, wherein the remedial action is removing the seed from the computing device.

7. The system of claim 5, wherein the remedial action is sending a message to the authentication service indicating that the computing device has been compromised.

8. A method, comprising:
receiving a request to generate a seed, wherein the seed can be used to generate one or more one-time passwords that authenticate a computing device with an authentication service;
receiving, from the authentication service by the computing device, device security requirements that specify a posture of the computing device that is required to generate the seed;
obtaining a device posture summary from a mobile threat defense service operating on the computing device, wherein the device posture summary includes security information of the computing device;
determining a device security status based at least in part on the device posture summary and the device security requirements;
generating, when the device security status indicates that the device posture summary is acceptable based on the device security requirements, the seed; and
storing the seed on the computing device.

9. The method of claim 8, wherein the device posture summary indicates that the computing device is at least one of jailbroken or rooted.

10. The method of claim 8, wherein the device posture summary indicates that the computing device has received one or more security threats over network communication.

11. The method of claim 10, wherein the one or more security threats include at least one of a phishing attempt or an attempt to remotely control the computing device.

12. The method of claim 8, wherein:
the device posture summary is a first device posture summary;
the device security status is a first device security status; and
the method further comprising:
obtaining a second device posture summary from the mobile threat defense service;
determining a second device security status based at least in part on the second device posture summary and the device security requirements; and
performing, in response to determining that the second device security status indicates that the computing device is not secure, a remedial action.

13. The method of claim 12, wherein the remedial action is removing the seed from the computing device.

14. The method of claim 12, wherein the remedial action is sending a message to the authentication service indicating that the computing device has been compromised.

15. A non-transitory, computer-readable medium, comprising machine-readable instructions that, when executed by a processor of a computing device, cause the computing device to at least:
receive a request to generate a seed, wherein the seed can be used to generate one or more one-time passwords that authenticate the computing device with an authentication service;
receive, from the authentication service, device security requirements that specify a posture of the computing device that is required to generate the seed;
obtain a device posture summary from a mobile threat defense service operating on the computing device, wherein the device posture summary includes security information of the computing device;
determine a device security status based at least in part on the device posture summary and the device security requirements;
generate, when the device security status indicates that the device posture summary is acceptable based on the device security requirements, the seed; and
store the seed on the computing device.

16. The non-transitory, computer-readable medium of claim 15, wherein the device posture summary indicates that the computing device is at least one of jailbroken or rooted.

17. The non-transitory, computer-readable medium of claim 15, wherein the device posture summary indicates that the computing device has received one or more security threats over network communication.

18. The non-transitory, computer-readable medium of claim 15, wherein:
the device posture summary is a first device posture summary;
the device security status is a first device security status; and
the machine-readable instructions that, when executed by the processor of the computing device, further cause the computing device to at least:
obtain a second device posture summary from the mobile threat defense service;
determine a second device security status based at least in part on the second device posture summary and the device security requirements; and
perform, in response to determining that the second device security status indicates that the computing device is not secure, a remedial action.

19. The non-transitory, computer-readable medium of claim 18, wherein the remedial action is removing the seed from the computing device.

20. The non-transitory, computer-readable medium of claim 18, wherein the remedial action is sending a message to the authentication service indicating that the computing device has been compromised.

* * * * *